No. 705,895. Patented July 29, 1902.
J. G. BAHR.
COVERING FOR DEMIJOHNS.
(Application filed Jan. 9, 1902.)

(No Model.)

WITNESSES:

INVENTOR
Jacob G. Bahr
BY
ATTORNEYS

UNITED STATES PATENT OFFICE.

JACOB G. BAHR, OF BROOKLYN, NEW YORK.

COVERING FOR DEMIJOHNS.

SPECIFICATION forming part of Letters Patent No. 705,895, dated July 29, 1902.

Application filed January 9, 1902. Serial No. 88,987. (No model.)

*To all whom it may concern:*

Be it known that I, JACOB G. BAHR, a citizen of the United States, and a resident of the city of New York, borough of Brooklyn, in the county of Kings and State of New York, have invented a new and Improved Covering for Demijohns, of which the following is a full, clear, and exact description.

The object of the invention is to provide a new and improved covering for demijohns which is simple and durable in construction, easily applied, and arranged to protect the glass vessel against pressure, to provide a firm handle, and to retain the contents of the glass vessel in case the sides thereof become cracked.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
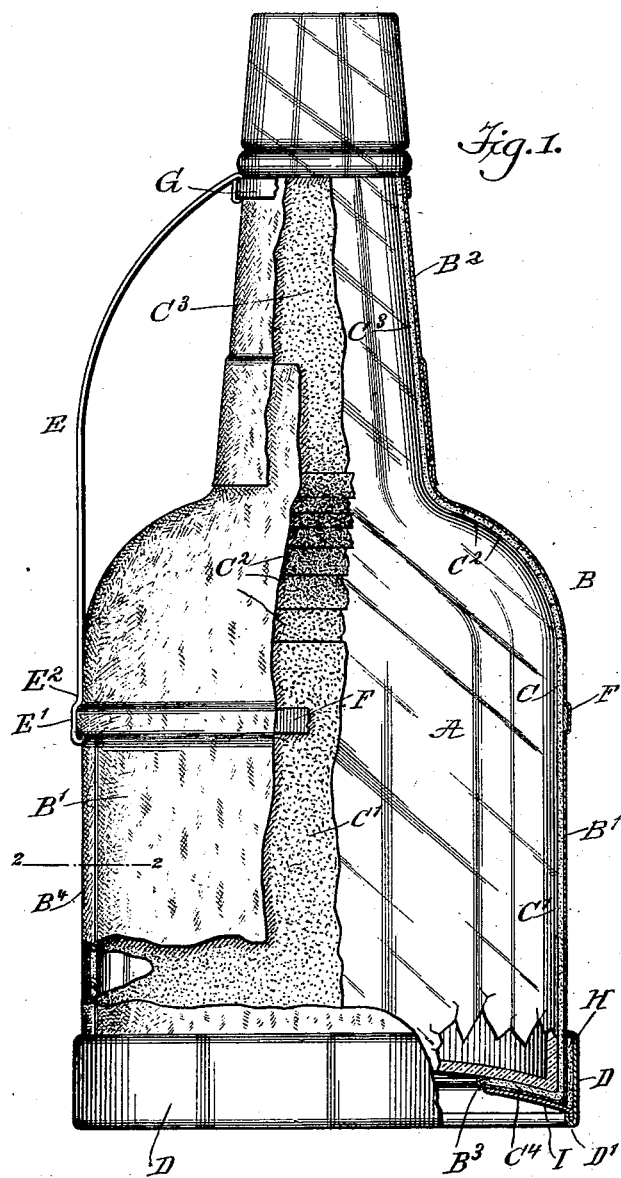
Figure 2:
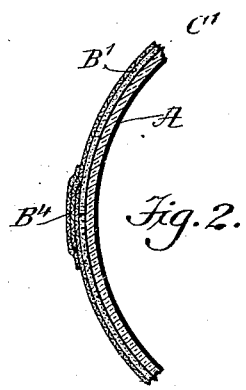
Figure 3:
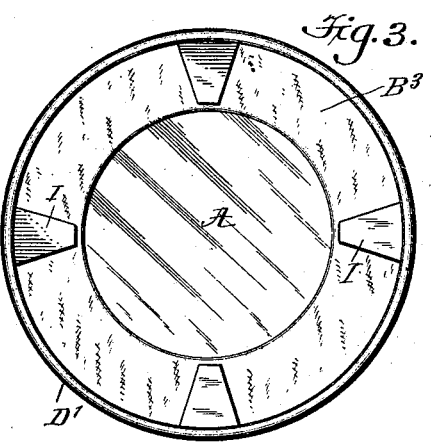
Figure 4:
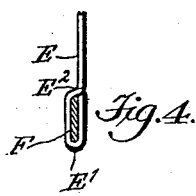

Figure 1 is a side elevation of the improvement with parts broken out and parts in section. Fig. 2 is a sectional plan view of part of the same on the line 2 2 of Fig. 1. Fig. 3 is an inverted plan view of the improvement, and Fig. 4 is a sectional side elevation of part of the same.

The covering for a demijohn or other glass vessel A consists, essentially, of a shell B, a lining C, a metallic bottom ring D, and a handle E, attached at its lower end to a ring F and at its upper end to a neck-band G, secured to the neck of the glass vessel A. The shell B is made in sections B' and B², of which the section B' is for the body portion of the glass vessel and extends at its upper end a short distance upon the neck portion, to be overlapped at said end by the neck-section B² of the shell. The shell B is preferably made of a woven fabric—such as canvas, cheesecloth, or the like—and lies close to the outer surface of the vessel A. The lining C is made of a soft material, such as paper, and the said lining has a body-section C' extending around the spherical portion of the body of the vessel, the upper end of the body portion being made in the shape of rings $C^3$, one alongside the other and extending around the upper part of the spherical portion of the vessel's body to insure a close fit on the said spherical portion, as will be readily understood by reference to Fig. 1. The uppermost ring $C^2$ abuts against the lower end of the neck-section $C^3$ of the lining, and the lower end of the body-section C' of the lining is extended under the outer portion of the bottom of the vessel A to form a ring $C^4$, engaged by a ring $B^3$ of the body portion B' of the shell B. The metallic bottom ring D is held on an annular flange H, glued or otherwise secured to the shell B at the lower end thereof, and the said metallic ring D is bent over at its upper edge to engage the upper edge of the said flange H to securely hold the metallic bottom ring D in position on the covering. The lower end D' of the metallic ring D is bent inwardly and upwardly to receive the inner ends of prongs or a flange I, extending inwardly and abutting against the under side of the ring $B^3$ to hold the latter and the ring $C^4$ in proper position in the bottom of the vessel A. The handle E, previously mentioned, is formed at its lower end with a hook E', hooking onto the lower edge of the ring F, a suitable opening being cut in the covering-section B' to allow the hook E' to engage the ring. (See Fig. 4.) The ring F is interposed between the lining C and the shell B at the body-sections thereof, so that the ring is held against movement in either an upward or downward direction, it being understood that the covering-shell is glued, cemented, or otherwise fastened to the lining by a suitable adhesive substance, and in a similar manner the lining is fastened to the bottle. In order to prevent the hook E' from disengaging the ring F, I provide the handle E with an inwardly-bent portion $E^2$, pressing upon the top of that portion of the body-section B' lying directly over the upper edge of the ring F. Thus the lower or hooked end of the handle E is not liable to move out of engagement with the ring F. The upper portion of the body-section B' is preferably gored to fit snugly over the rings $C^2$, engaging the spherical upper end of the body of the vessel A. A suitable varnish or the like is applied to the shell B after the same is in position on the vessel to give a nice finish to the covering. The body-section B' has its joint preferably in vertical alinement with the handle E, and this joint is covered by a reinforcing-strip B⁴ of a fabric material and cemented or glued to the said body-section.

It will be seen that by the construction described the bottom ring D is securely held in position on the covering, and the lower end D' of the said ring forms a firm support for the vessel when the latter is set down, it being understood that the said lower edge D' is a distance below the bottom of the vessel A, so that the latter is not liable to be injured when the demijohn is placed on the floor or other support.

Having thus described my invention, I claim as new and desire to secure by Letters Patent—

1. A covering for demijohns, comprising a shell made of a woven fabric material, and a lining for the shell made of soft material such as paper, the lining at the spherical body portion of the vessel being formed of rings to conform to the curvature of the said spherical portion, as set forth.

2. A covering for demijohns, comprising a shell made of a woven fabric material made in sections, of which one is the body-section and the other the neck-section, the body-section extending onto the neck portion of the vessel to be overlapped by the lower end of the neck-section, and a lining for the said shell made of a soft material such as paper, the lining consisting of a body-section, rings and a neck-section, as set forth.

3. A covering for demijohns, comprising a shell, a lining for the same, an annular flange at the lower end of the shell, a metallic ring on the said flange, and prongs carried by the said metallic ring and extending inwardly from the ring to engage the shell at the bottom of the vessel, as set forth.

4. A covering for demijohns, comprising a shell, a lining for the same, a ring interposed between the lining and shell, a neck-band on the vessel, and a handle engaging the neck-band and the said ring, as set forth.

5. A covering for demijohns, comprising a shell, a lining for the same, a ring interposed between the lining and shell, a neck-band on the vessel, and a handle engaging the neck-band and the said ring, the handle having its lower portion formed with a hook hooking onto the ring, and the handle being bent inwardly over the ring, as set forth.

6. A covering for demijohns, comprising a shell, a lining for the same, the lower ends of the shell and lining extending over the outer portions of the bottom of the vessel, an exterior flange on the said shell at the lower end thereof, a metallic ring held on the said flange, and prongs extending inwardly from the said ring to engage that portion of the covering held against the bottom of the vessel, as set forth.

In testimony whereof I have signed my name to this specification in the presence of two subscribing witnesses.

JACOB G. BAHR.

Witnesses:
JOHN ROETHLEIN,
JOHN PETRI.